Patented Jan. 1, 1946

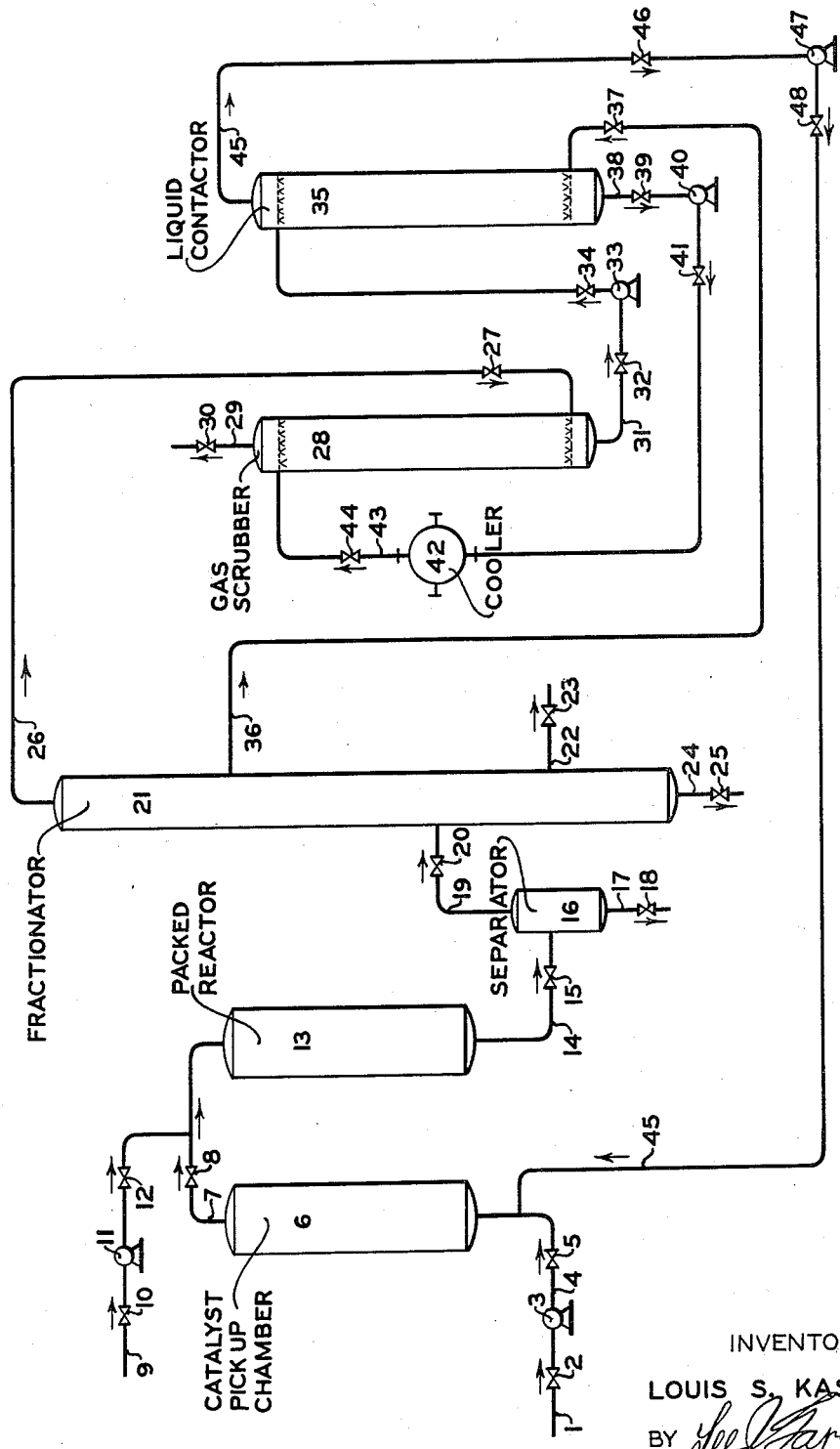

2,392,047

UNITED STATES PATENT OFFICE 2,392,047

METHOD OF HYDROGEN HALIDE RECOVERY

Louis S. Kassel, Chicago, Ill., assignor to Universal Oil Products Company, Chicago, Ill., a corporation of Delaware Application July 14, 1941, Serial No. 402,345

7 Claims. (Cl. 260—683.4)

This invention relates to a method of recovering relatively dry hydrogen halides from gaseous mixtures containing hydrogen halides and is more particularly concerned with the method of recovering and returning hydrogen halides to hydrocarbon conversion processes in which relatively dry hydrogen halides are used as catalyst activators.

In catalytic processes such as alkylation or isomerization which employ an aluminum halide catalyst, it is generally necessary to add a relatively small amount of the corresponding dry hydrogen halide to activate the aluminum halide catalyst. Since the hydrogen halide is not consumed in the process, it is carried out of the reaction zone with the conversion products. The amount of hydrogen halide that is added is usually in the range of between 1 and 10% of the total charge to the process, and in order to reduce the cost of operating the process, it is desirable to recover the hydrogen halide from the conversion products so that it may be recycled. The exit gases from alkylation and isomerization processes will contain ethane and/or propane as well as hydrogen halide.

A hydrogen halide such as hydrogen chloride is easily separated from hydrocarbons heavier than propane by fractionation but is not easy to separate from ethane or propane. If the ethane and propane are not removed from the hydrogen chloride that is recycled to the beginning of the process, an undesirable amount of these hydrocarbons will gradually be built up in the system. The present invention makes possible the recovery and purification of hydrogen chloride occurring in the exit gases from hydrocarbon conversion processes which employ it as a catalyst activator.

One specific embodiment of this invention comprises a process for the recovery of relatively dry hydrogen halide from a mixture of gases which comprises extracting a substantial portion of the hydrogen halide from said mixture with an aqueous liquid and contacting the resulting aqueous solution of hydrogen halide with an organic liquid having selective solvent action on the hydrogen halide.

When employing a hydrogen halide such as hydrogen chloride as an activator for an aluminum halide catalyst, such as aluminum chloride, it is necessary that the hydrogen halide be free from water to prevent a rapid deterioration of the aluminum halide catalyst which would combine with water to form alumina and hydrogen halide.

In the process of the present invention the hydrogen halide in the exit gases of a hydrocarbon conversion process is recovered by scrubbing the exit gases with an aqueous liquid and then contacting the resulting solution of hydrogen halide with all or a portion of the hydrocarbon reactants which have a selective solvent action on the hydrogen halide. The reactants, laden with the dissolved hydrogen halide, are then directed to the catalytic reaction zone. Usually the above mentioned aqueous liquid will be a lean aqueous solution of hydrogen halide which was left after contacting the previously enriched solution with the hydrocarbon treactants. The reactants that are used to pick up hydrogen halide from the aqueous solution may consist of all or a portion of the fresh charge and/or all or a portion of a recycle stream.

One hydrocarbon conversion process which may employ this method of recovering dry hydrogen halide is, by way of illustration, the alkylation of iso-butane with ethylene and/or propylene in the presence of an aluminum chloride catalyst and hydrogen chloride. Usually the olefin mixture used will contain some ethane and propane as well as the ethylene and propylene. These saturated hydrocarbons do not enter into the reaction and therefore will appear in the exit gases along with the hydrogen chloride which was introduced with the charge to activate the catalyst. In order to minimize undesirable side reactions such as polymerization, it is necessary to have several times more iso-butane than olefins present in the reaction zone. The reaction products are fractionated into alkylate, iso-butane, and hydrogen chloride-containing gases. After the gases have been scrubbed with the lean aqueous solution of hydrogen chloride the iso-butane fraction is subjected to intimate contact with the enriched aqueous solution whereby to dissolve a portion of the hydrogen chloride. It is then combined with the fresh charge to the catalytic reaction zone.

The accompanying drawing diagrammatically illustrates an aluminum chloride alkylation process embodying the method for recovering a hydrogen halide as disclosed by this invention.

Referring to the drawing an iso-butane charge at a desired reaction temperature enters through line 1, valve 2, pump 3, line 4, and valve 5. At this point the incoming stream is combined with recycled iso-butane and hydrogen chloride directed through line 45 as will be shown later. The combined stream passes to the catalyst pick-up chamber 6. This chamber is filled with granular aluminum chloride and a portion of the aluminum chloride catalyst dissolves in the iso-butane here. The catalyst laden iso-butane passes through line 7 and valve 8. A mixture of ethylene, ethane, and enough hydrogen chloride to make up for losses elsewhere in the system is introduced through line 9, valve 10, pump 11, and valve 12 to line 7 where it is combined with the catalyst laden iso-butane stream and sent to the packed reactor 13. The ratio of iso-butane to olefin in the stream entering packed reactor 13 is approximately 7:1. This reactor is packed with a substantially inert supporting material upon which the incoming catalyst will be deposited. The reaction products from packed reactor 13 pass through line 14 and valve 15 to separator 16 where any entrained aluminum chloride hydrocarbon complex is separated and withdrawn through line 17 and valve 18. The reaction products then pass through line 19 and valve 20 to fractionator 21. The motor fuel alkylate product is withdrawn through line 22 and valve 23 and a heavier alkylate is withdrawn through line 24 and valve 25.

From the top of fractionator 21 a gaseous mixture of ethane and hydrogen chloride is withdrawn through line 26 and valve 17 and passes to gas scrubber 28 where substantially all of the hydrogen chloride in the gases is removed by scrubbing with an aqueous solution of hydogen chloride admitted to scrubber 28 from line 43. The remaining gas is withdrawn through line 29 and valve 30. The enriched aqueous solution of hydrogen chloride is withdrawn from gas scrubber 28 through line 31, valve 32, and pump 33 and is directed through valve 34 to liquid contactor 35 wherein the enriched hydrogen chloride solution is intimately contacted with an iso-butane fraction withdrawn from fractionator 21 through line 36 and valve 37 and directed to contactor 35.

A lean aqueous solution of hydrogen chloride is withdrawn from the bottom of liquid contactor 35 through line 38, valve 39, and pump 40 and the stream is directed through valve 41, cooler 42, line 43, and valve 44 to gas scrubber 28 again. The lean aqueous solution of hydrogen chloride is cooled in cooler 42 to about −5° C. From the top of liquid contactor 35 a solution of hydrogen chloride in iso-butane is withdrawn through line 45, valve 46, and pump 47 and is returned through valve 48 and line 45 to line 4 where it is commingled with the fresh charge.

This invention may also be applied to an aluminum chloride isomerization process with certain modifications. The exit gas from the isomerization of normal butane will contain only small amounts of other gases besides hydrogen chloride. This, together with the fact that a larger percentage of hydrogen chloride is required in the charge to the process, indicates that it will be desirable to treat only a portion of the gases from the process in the manner of this invention. The rest of the hydrogen chloride-containing gases may be returned directly to the reactant stream. The proportion of hydrogen chloride gases treated in this manner will be determined by the rate at which ethane and propane accumulate in the recycled gases. A recycled stream of normal butane may be used to pick up the hydrogen chloride from the enriched aqueous solution of hydrogen chloride in an isomerization process.

The following illustrative example indicates how the invention may be used in an alkylation process

*Example*

The exit gases from a process for the alkylation of isobutane with ethylene in the presence of an aluminum chloride catalyst, containing 12.5 mol per cent of hydrogen chloride and 87.5 mol per cent of ethane are scrubbed at 200 pounds pressure with a lean aqueous solution of hydrogen chloride containing 35% by weight of hydrogen chloride. The incoming lean aqueous solution is cooled to about −5° C. Cooling is also used in the scrubber in order to maintain the outlet temperature of the enriched aqueous solution of hydrogen chloride at about 10° C. The enriched aqueous hydrogen chloride solution leaving the scrubber contains 45% by weight of hydrogen chloride. The outlet gas from the scrubber contains 0.15 mol per cent of hydrogen chloride and 99.85 mol per cent of ethane. The enriched aqueous solution from the scrubber is extracted with iso-butane to again give a lean hydrogen chloride solution containing 35% hydrogen chloride by weight and an outlet iso-butane stream containing 2% hydrogen chloride by weight.

The above specification and example indicate a specific process in which the method of hydrogen halide recovery as shown in this invention may be employed However, it is not intended that the broad scope of the invention should be limited in any way by the description given or the example cited.

I claim as my invention:

1. In a process for the conversion of hydrocarbons in which substantially dry hydrogen halide is added with the hydrocarbon charge and a mixture of hydrogen halide and hydrocarbon gases is separated from the conversion products, the improvement which comprises removing a substantial portion of the hydrogen halide from said mixture in an extraction step by contacting the mixture with a lean aqueous solution of hydrogen halide produced in the process as hereinafter described, separating the resulting enriched aqueous solution of hydrogen halide from the remaining gases, subjecting said enriched aqueous solution of hydrogen halide to contact with a portion of the hydrocarbon to be charged to the process under conditions at which said hydrocarbons will have a selective solvent action on the hydrogen halide, and returning the resulting lean aqueous solution of hydrogen halide to the first-mentioned extraction step.

2. In a process for the alkylation of isobutane with olefins in which substantially dry hydrogen chloride is added with the hydrocarbon charge and a mixture of hydrogen chloride and hydrocarbon gases is separated from the conversion products, the improvement which comprises removing a substantial portion of the hydrogen chloride from said mixture in an extraction step by contacting the mixture with a lean aqueous solution of hydrogen chloride formed in the process as hereinafter described, separating the resulting enriched aqueous solution of hydrogen chloride from the remaining gases, subjecting said enriched aqueous solution of hydrogen chloride to contact with a recycle isobutane fraction separated from the conversion products under conditions at which said isobutane fraction will have a selective solvent action on the hydrogen chloride, and returning the resulting lean aqueous solution of hydrogen chloride to the first mentioned extraction step as hereinbefore set forth.

3. In a process for the alkylation of isobutane with olefins in which substantially dry hydrogen chloride is added with the hydrocarbon charge and a mixture of hydrogen chloride and hydrocarbon gases is separated from the conversion products, the improvement which comprises removing a substantial portion of the hydrogen chloride from said mixture in an extraction step by contacting the mixture with a lean aqueous solution of hydrogen chloride formed in the process as hereinafter described, separating the resulting enriched aqueous solution of hydrogen chloride from the remaining gases, subjecting said enriched aqueous solution of hydrogen chloride to contact with an iso-butane stream consisting of unreacted iso-butane separated from the conversion products and fresh isobutane charge under conditions at which said isobutane fraction will have a selective solvent action on the hydrogen chloride, directing said isobutane stream containing dissolved hydrogen chloride to the alkylation process, and returning the resulting lean aqueous solution of hydrogen chloride to the first-mentioned extraction step as hereinbefore set forth.

4. In a process for the isomerization of paraffins to produce branched or more highly branched chain paraffins therefrom in which substantially dry hydrogen chloride is added with the paraffin charge and a mixture of hydrogen chloride and hydrocarbon gases is separated from the conversion products, the improvement which comprises extracting a portion of the hydrogen chloride-containing gases in an extraction step by contacting the said gases with a lean aqueous solution of hydrogen chloride formed in the process as hereinafter described, separating the resulting enriched aqueous solution of hydrogen chloride from the remaining gases, subjecting said enriched aqueous solution of hydrogen chloride to contact with a paraffin hydrocarbon under conditions at which said paraffin hydrocarbon will have a selective solvent action on the hydrogen chloride, returning the resulting lean aqueous solution of hydrogen chloride to the first-mentioned extraction step, and directing the paraffin hydrocarbon containing dissolved hydrogen chloride to the isomerization process.

5. In the catalytic conversion of hydrocarbons in the presence of a hydrogen halide wherein there is formed a gaseous mixture containing hydrogen halide, the method which comprises contacting said mixture with an aqueous liquid to extract hydrogen halide from the mixture, treating the resultant aqueous solution of hydrogen halide with hydrocarbons to be converted in the catalytic step and having a selective solvent action on the hydrogen halide, and supplying the resultant halide-hydrocarbon solution to the catalytic conversion step.

6. The process as defined in claim 5 further characterized in that the catalytic conversion is an alkylation reaction and said hydrocarbons comprise isoparaffins.

7. The process as defined in claim 5 further characterized in that the catalytic conversion is a normal paraffin isomerizing reaction and said hydrocarbons comprise normal paraffins.

LOUIS S. KASSEL.